United States Patent

[11] 3,589,487

[72] Inventor Emerson Bradford Donnell, Jr.
 Hillsborough Township, Somerset Co., N.J.
[21] Appl. No. 869,676
[22] Filed Oct. 27, 1969
[45] Patented June 29, 1971
[73] Assignee Union Carbide Corporation
 New York, N.Y.

[54] FLYWHEEL OVERLOAD RELEASING BAND CLUTCH
 8 Claims, 4 Drawing Figs.
[52] U.S. Cl. ................................................. 192/56,
 192/80
[51] Int. Cl. ................................................. F16d 43/20,
 F16d 13/10
[50] Field of Search ........................................ 192/26, 56,
 80, 150; 74/572; 64/30 E

[56] References Cited
UNITED STATES PATENTS
| | | | |
|---|---|---|---|
| 1,167,010 | 1/1916 | Neel | 192/80 |
| 1,847,882 | 3/1932 | Lorig | 64/30 (E) |
| 2,743,803 | 5/1956 | Ferris | 64/30 (E) (X) |
| 3,335,835 | 8/1967 | Conlon | 192/56 (C) (X) |

Primary Examiner—Allan D. Herrmann
Attorneys—Paul A. Rose, Gerald R. O'Brien, Jr. and Aldo J. Cozzi ABSTRACT: A flywheel overload releasing band clutch employing a lever-actuated band clutch which clamps on two equal diameter concentric drums, one attached to the flywheel and the other attached to the flywheel shaft.

INVENTOR.
EMERSON B. DONNELL, Jr.

BY

ATTORNEY

INVENTOR.
EMERSON B. DONNELL, Jr.

ATTORNEY 3,589,487

FLYWHEEL OVERLOAD RELEASING BAND CLUTCH

FIELD OF INVENTION

This invention relates to an improved release device for flywheels. More particularly, this invention relates to a releasing band clutch for the timely release of flywheels during overloading conditions.

THE PRIOR ART

Flywheels are commonly used for such purposes as minimizing fluctuations in the speed of rotating machine members, and reducing drive motor size by adding or substracting energy to the rotating member. In instances of severe negative acceleration due to such failures as machine jam-ups, the flywheel inertia is limited only by the rate of acceleration. Such negative acceleration creates practically limitless available torque and damage often results to the rotating machine member.

To prevent or reduce damage to the machine, overload devices such as shear keys, shear pins, slip clutches, and latching mechanisms are used to connect the flywheel to the shaft. Each of these devices, although serving useful purposes in certain instances, has its disadvantages. For example, slip clutches heat up and/or wear out from frequent use; shear keys and shear pins can fatigue and fail prematurely as well as requiring considerable disassembly for replacement; and latching mechanisms wear out from the shaking due to vibration of the flywheel with respect to its shaft, particularly in the case of heavy flywheels.

Thus, an overload releasing device which would have minimum wear from frequent use, heat buildup or vibrations, as well as minimum instances of fatigue and subsequent failure would be most suited for use in flywheels which have by high incidence of undue acceleration.

It is, accordingly, the prime object of the present invention to provide a flywheel overload releasing devices which permits a flywheel to rotate freely after a predetermined amount of torque and requires minimum maintenance and repair.

SUMMARY

In accordance with the present invention, a flywheel overload releasing device is provided employing a concentric support member rigidly secured to a rotatable shaft means upon which a flywheel is rotatably mounted, the support member being of equal diameter to the flywheel; clutch band means associated with the support member and the flywheel and mounted for engagement and disengagement against the support member and flywheel; clamping means for engaging the clutch band means to the support member and flywheel at a predetermined tensile force; lever means connected with the clamping means for actuating the clamping means to effect disengagement of the clutch band from the support member and flywheel; and lever actuating means positioned on the flywheel so as to actuate the lever means upon a predetermined slippage of the flywheel, thereby causing free rotation of the flywheel.

In another aspect of the present invention an overload releasing device for flywheels is provided employing at least two equal diameter, concentric support members mounted on rotatable shaft means upon which a flywheel is mounted, one of the support members being rigidly secured to the shaft and one of the support members being rigidly secured to the flywheel; clutch band means associated with the concentric support members and mounted for engagement and disengagement against the support members; clamping means for engaging the clutch band to the support members at a predetermined tensile force; lever means connected with the clamping means for actuating the clamping means to effect disengagement of the clutch band from the support members; and lever-actuating means positioned on the support member rigidly secured to said flywheel so as to actuate the lever means upon a predetermined slippage of the flywheel, thereby causing free rotation of the flywheel.

Reference is made to the figures of the drawings in which.

DESCRIPTION

Figure 1:
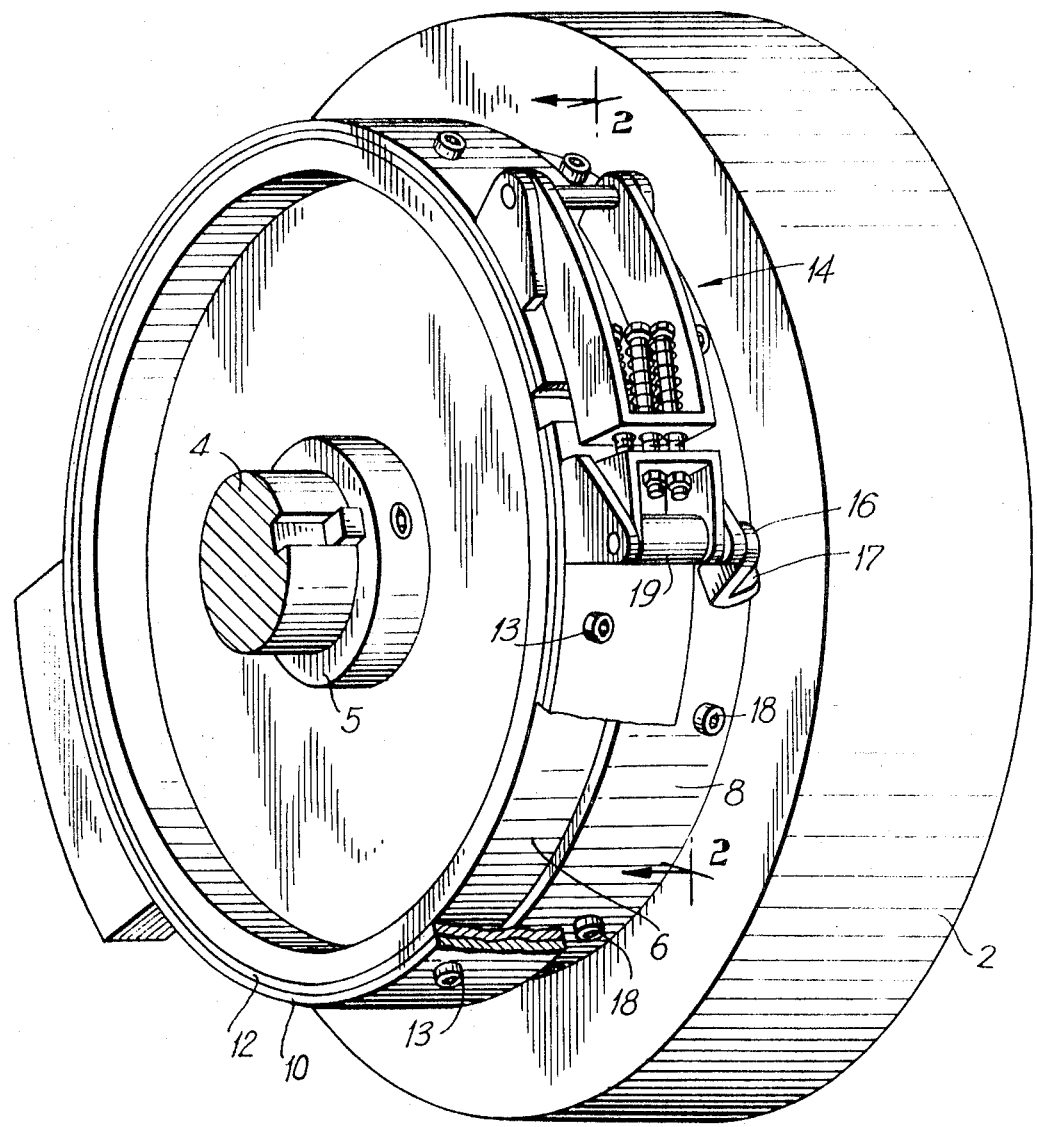
FIG. 1 is a schematic view of the preferred releasing band clutch in an engaged position.
Figure 2:
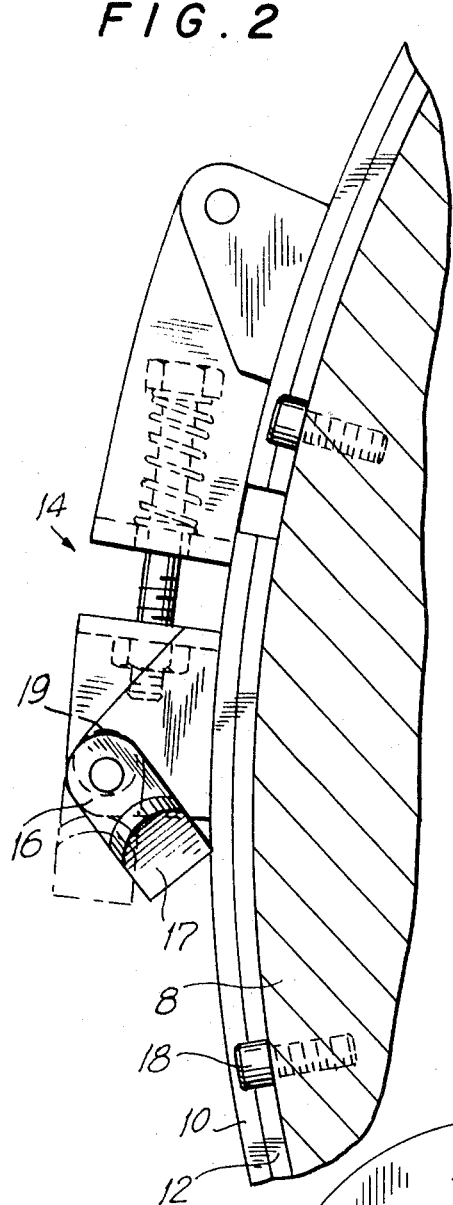
FIG. 2 is a sectional view of the releasing band clutch of FIG. 1 taken along lines 2-2.
Figure 3:
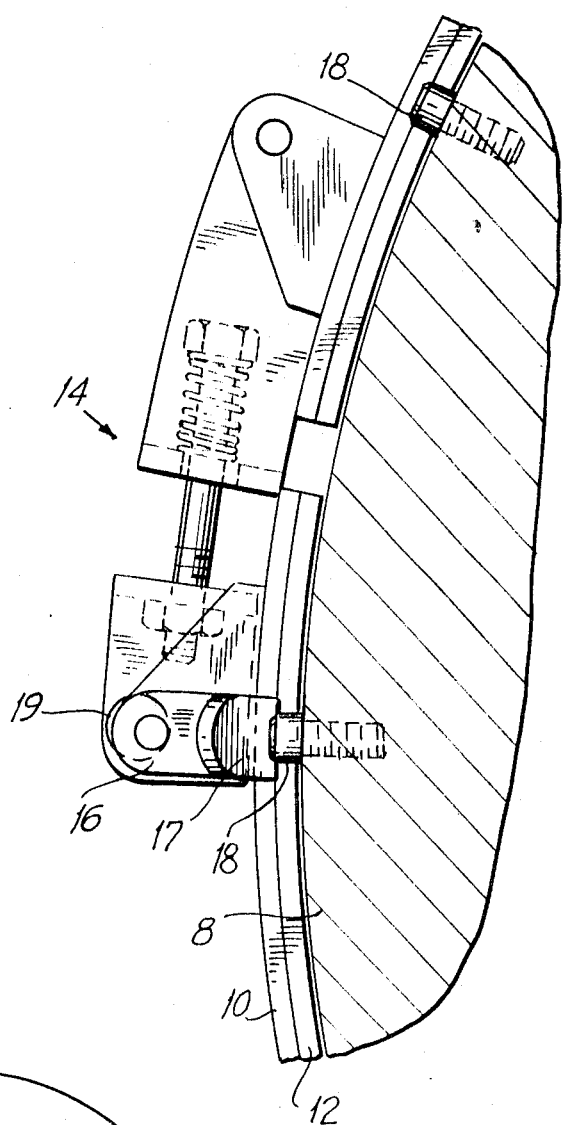
FIG. 3 is a schematic view of the releasing band clutch of FIG. 1 shown in the disengaged position.

In FIG. 1 of the drawings, a flywheel 2 mounted on a rotatable shaft 4 by a bearing (not shown), is provided with a releasing band clutch device employing two equal diameter, concentric drums 6,8 mounted on the shaft. One of the drums is rigidly secured to the shaft 4 (hereinafter called the shaft drum 6) by a shaft hub 5. The other drum 8 is rigidly secured to the flywheel 2 (hereinafter called the flywheel drum 8) by bolts. The drums 6,8 although secured to the shaft 4 and flywheel 2 by shaft hub 5 and bolts, respectively can be secured by other suitable conventional means. The diameters of the drums are not critical, the only requirement being that they are of equal diameter. For simplicity of construction, preferably the drums are of the same diameter as the flywheel.

A metal band 10, with a composite lining 12 attached to the interior, is wrapped around both drums 6,8. From the standpoint of durability, availability and cost the preferred metal employed is steel, although other suitable substitutes could be employed. The composite lining 12, which is employed at the interface between the band 10 and the drums 6,8 can be any typical composite clutch and brake lining. The composite lining 12 is attached to the band 10 by conventional adhesive. Preferably, shoulder bolts 13 are employed to secure the band 10 to the shaft drum 6 to prevent the band 10 from turning with respect the shaft drum 6.

A clamping mechanism 14 is employed to tighten the band 10 to a predetermined tensile force. Preferably, the clamping mechanism is a toggle clamping mechanism employing a spring loaded link and preferably an eccentric shaft 19 for loading the link. The tensile force to be applied against the flywheel drum can vary widely and a choice as to the desired tensile force would depend upon the purpose for which the releasing band clutch of the present invention is being employed. A lever 16 is mounted on the clamping mechanism 14 for actuating the toggle clamping mechanism 14 to effect disengagement of the band by releasing the clamping force created by the springs. The lever 16 is actuated by bolt heads 18 mounted on the outer surface of the flywheel drum 8 in predetermined spaced positions. The boltheads are all mounted so as to contact the lever 16 upon a predetermined amount of slippage of the flywheel drum 8. Preferably the boltheads 18 are equally spaced about the flywheel drum 8. The spacing between boltheads 18 depends upon the amount of slippage of the flywheel drum 8 which could be tolerated. Preferably, the boltheads 18 are spaced about from 2 to about 6 inches apart. Thus, the number of boltheads 18 on each flywheel drum would be dependent upon the diameter of the flywheel drum as well as the permissible amount of slippage of the flywheel. Preferably, the lever 16 includes a trigger 17 which is pivotably mounted thereto to allow for possible creep between flywheel drum 8 and band 10. During normal operation, centrifugal force holds the trigger 17 out of the path of the boltheads 18. During negative acceleration of the assembly, inertial force throws the trigger into the path, allowing for operation of the lever against the bolt heads 18.

Figure 4:
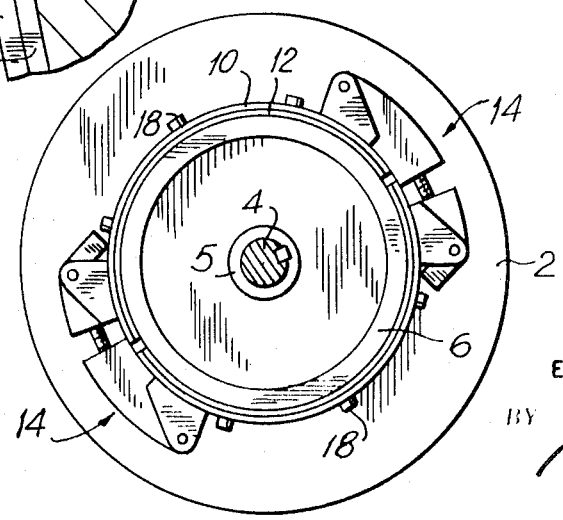
FIG. 4 is another embodiment the releasing band clutch of the present invention showing a dual clamping mechanism.

Alternatively, as shown in FIG. 4, the releasing band clutch of the present invention is provided employing two clamping mechanisms preferably mounted on the band on opposite sides and each having its own lever for disengaging the clamping force against the flywheel drum. The second lever would be mounted on its clamping mechanism so as to disengage the clamping mechanism when slippage of the flywheel drum occurs in the opposite direction. When employing such double clamping mechanism, which can be actuated by slippage in either direction, the releasing clutch band of the present invention operates to permit free rotation of the flywheel in instances of positive and negative acceleration.

In another embodiment of the present invention, the clutch band 10 is employed against the flywheel directly without the necessity of a flywheel drum 8. A support member, such as a drum, is employed with the flywheel to provide the surface against which the releasing band clutch of the present invention operates. In such instance, the lever-actuating means, such as the boltheads, are mounted on the flywheel directly. Alternatively, such embodiment can also employ a dual clamping mechanism as previously described, which would operate under positive as well as negative accelerations.

In another embodiment of the present invention, the band 10 is secured to the flywheel and the lever-actuating means is on the shaft drum whereby the releasing band clutch of the present invention is actuated when overload slippage occurs between the band and shaft drum.

The flywheel overload releasing band clutch operates to permit a flywheel to rotate freely when positive or negative acceleration becomes too severe and the inertia of the rotating member would otherwise create extensive damage. When the rotating machine member is in normal operation, the flywheel overload releasing band clutch of the present invention is tightly engaged against the drums 6,8 by means of the toggle clamping mechanism, and the friction created at the interface of the composite lining 12 and the flywheel drum 8 prevents rotation of the flywheel drum 8 with respect to band 10. This friction force is sufficient to transmit normal peak loads from flywheel to shaft, but when a severe overload occurs, slippage takes place at this friction interface. As this slippage occurs, boltheads 18 pass by trigger 17 actuating the lever 16 and thereby releasing the clamping force through an eccentric shaft. With the clamping force reduced to zero, the flywheel 2 is free to coast to a stop without adding frictional heat to the band and flywheel drums.

The flywheel and flywheel overload releasing band clutch is useful with most any type of rotating machine where it is desired to have minimum fluctuations in speed, or reduce the size of the motor which rotates the shaft. For example, hot sheet shredders which tear warm sheets of material and spin at high revolutions per minute find flywheels most useful for minimizing motor size.

What I claim is:

1. A flywheel overloading releasing device comprising a concentric support member rigidly secured to a rotatable shaft means upon which a flywheel is rotatably mounted, said support member being of equal diameter to said flywheel; clutch band means associated with said support member and said flywheel and mounted for engagement and disengagement against said support member and flywheel; clamping means for engaging said clutch band means to said support member and flywheel at a predetermined tensile force; lever means connected with said clamping means for actuating said clamping means to effect disengagement of said clutch band from said support member and flywheel; and lever-actuating means, positioned for contact with said lever means so as to actuate said lever means upon a predetermined slippage, thereby causing free rotation of said flywheel.

2. The device of claim 1 wherein said lever-actuating means is mounted on said flywheel.

3. A flywheel overload releasing device comprising at least two equal diameter, concentric drums mounted on rotatable shaft means upon which a flywheel is mounted, one of said drums being rigidly secured to said shaft and one of said drums being rigidly secured to said flywheel;
   clutch band means associated with said concentric drums and mounted for engagement and disengagement against said drums;
   clamping means for engaging said clutch band to said drums at a predetermined tensile force;
   lever means connected with said clamping means for actuating said clamping means to effect disengagement of said clutch band from said drums;
   and lever-actuating means positioned on said drum rigidly secured to said flywheel so as to actuate said lever means upon a predetermined slippage of said flywheel, whereby causing free rotation of said flywheel.

4. The device of claim 3 wherein said clutch band means comprises a composite lining and a metal band.

5. The device of claim 3 wherein said clamping means comprises a toggle clamping mechanism.

6. The device of claim 5 wherein the toggle clamping mechanism comprises a spring loaded link and an eccentric shaft for loading said link.

7. The device of claim 3 wherein said clamping means comprises two clamping mechanisms and two lever means connected thereto to permit disengagement of said clutch band means upon slippage of said flywheel in either direction.

8. The device of claim 3 wherein lever actuating means comprises a plurality of bolts secured to said flywheel.